Patented Oct. 27, 1953

2,657,222

UNITED STATES PATENT OFFICE 2,657,222

2,6-DI-TERTIARY ALKYL QUINONES AND PROCESS OF PREPARING SAME

Charles F. H. Allen and Donald M. Burness, Rochester, N. Y., assignors to Eastman Kodak Company, Rochester, N. Y., a corporation of New Jersey No Drawing. Application April 28, 1951, Serial No. 223,644

8 Claims. (Cl. 260—396)

This invention relates to the preparation of highly substituted quinones and more particularly to the preparation of 2,6-di-tert.-alkylquinones such as 2,6-di-tert.-butylquinone.

It is known that substituted toluenes can be oxidized to produce aromatic aldehydes; for example, Carpenter et al. U. S. Patents 2,450,877-8-9, disclose that highly substituted toluenes can be oxidized in the presence of manganese dioxide and sulfuric acid to aldehydes. Smith et al. U. S. Patent 2,358,833 discloses that triarylbutylene derivatives of p-cresol can be oxidized to aldehydes such as 3-tert.-butyl-4-tert.-butoxybenzaldehyde. However, methods for the oxidation of highly substituted and sterically hindered cresols such as 2,6-di-tert.-butyl-p-cresol, particularly to form quinones, to our knowledge have not previously been described.

We have discovered that if 2,6-di-tert.-alkyl-p-cresols such as 2,6-di-tert.-butyl-p-cresol or the acetoxy derivatives thereof, are oxidized under suitable conditions, substantial quantities of 2,6-di-tert.-alkylquinones such as 2,6-di-tert.-butylquinone are formed.

According to the process of our invention, in order to produce appreciable quantities of the quinone by oxidation of the 2,6-di-tert.-alkyl-p-cresols or their esters, oxidation is carried out in a solution of a mixture of acetic acid and acetic anhydride in the presence of chromic anhydride and sulfuric acid. The result of oxidizing the cresol in this manner is to produce the mentioned quinone and as a by-product either a 3,5-di-tert.-alkyl-4-acetoxybenzaldehyde or the aldehyde diacetate as shown in the following reactions:

I.
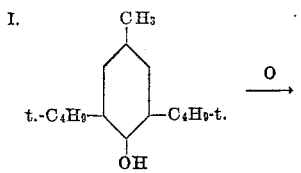

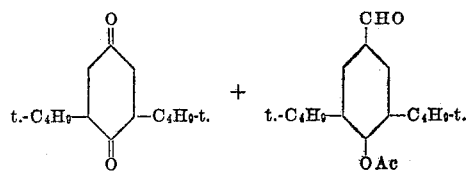

II.
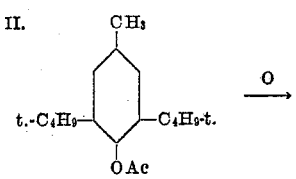

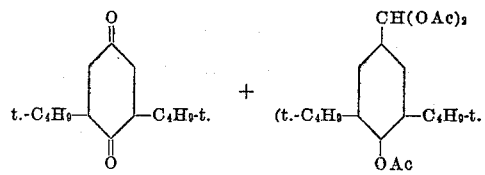

In process I it is considered that in the presence of acetic anhydride and acid, the cresol acetate used as the starting material in II, is first formed, and oxidation proceeds from this point substantially as shown in II except that in I the free aldehyde is obtained in admixture with the quinone rather than the aldehyde diacetate. Accordingly, in the broadest aspects of our invention, we prepare the mentioned quinones by oxidation of the 2,6-di-tert.-alkyl cresol acetate whether starting initially from the cresol or its acetic acid ester. More specific embodiments of our invention include obtaining the desired quinone by oxidizing a 2,6-di-tert.-alkyl-p-cresol as described in reaction I above.

In view of the prior art mentioned above, since it might be expected that oxidation of the di-tert.-alkyl-p-cresols such as 2,6-di-tert.-butyl-p-cresol, would produce an aldehyde, it is surprising that appreciable yields of a quinone are obtained in the above reactions. This production of the quinone from the hindered p-cresols in more particularly surprising in view of the fact that it has been found that the oxidation of certain 3,4,6-trialkylphenols having a tertiary butyl group in the 6-position in acetic acid solution with potassium dichromate sulfuric acid formed the corresponding 3,3',4,4',6,6'-hexalkyl-2,2'-dihydroxydiphenyl. In the oxidation of 3-methyl-4,6-di-tert.-butylphenol, 2-methyl-5-tert.-butylquinone was obtained as a by-product but with three phenols having a methyl group in the 4-position, no quinone was isolated.

In the above reactions I and II, presumably acetic anhydride materially influences the course of the reaction since in its absence no aldehyde is formed and yields of the quinone are decreased. The desired products such as 2,6-di-tert.-butylquinone are considered to be of importance in connection with the perfume industry since the quinone possesses a pleasant spicy smell in contrast to most quinones and in particular in comparison to the 2,5-isomer 2,5-di-tert.-butylquinone, which has no appreciable smell. The 2,6-di-tert.-alkylquinones such as 2,6-di-tert.-butylquinone, are further valuable for use in the preparation of the corresponding 2,6-di-tert.-alkyl-hydroquinones by reduction, which compounds possess good antioxidant properties when employed for the preservation of foodstuffs such as lard.

The following examples illustrate our methods for the preparation of the 2,6-di-tert.-alkylquinones such as 2,6-di-tert.-butylquinone, from 2,6-di-tert.-alkyl-p-cresols or esters thereof.

PROCEDURE

4-acetoxy-3,5-di-tert.-butyltoluene

A solution of 25 parts of 2,6-di-tert.-butyl-p-cresol, 100 parts of acetic anhydride, and 1 part of concentrated sulfuric acid was heated for 16 hours on the steam bath. The mixture was poured into ice, and the solid product filtered, washed and dried. Recrystallization from 90% ethanol yielded 25 parts of pure white crystals; M. P. 71.5–72.5°.

4-acetoxy-3,5-di-tert.-butylbenzaldehyde diacetate and 2,6-di-tert.-butylquinone A solution of 13.1 parts of 4-acetoxy-3,5-di-tert.-butyltoluene in 110 parts of glacial acetic acid and 83 parts of acetic anhydride was cooled to 10°, and 22.5 parts of concentrated sulfuric acid added slowly. Then at 0–2° C. 14.5 parts of powdered chromium trioxide was added during two hours, with stirring. The mixture was stirred one hour longer and poured into ice. The yellow gum which formed was filtered, dissolved in ether, and the ether solution washed with water bicarbonate solution and brine. On evaporation of the ether solution, 10.6 g. of yellow oil remained, which partially crystallized during 3 days at room temperature. The crystals were separated, and recrystallized from ligroin-petroleum ether to give 1.2 parts of fine, white needles; M. P. 104.5–106.5°. Two more crystallizations from ligroin yielded the pure 4-acetoxy-3,5-di-tert.-butylbenzaldehyde diacetate; M. P. 119.5–120.5°.

Calcd. for $C_{21}H_{30}O_6$: C, 66.6; H, 8.0. Found: C, 66.4; H, 7.9.

The mother liquors from the crystallization were combined and distilled to give 1.6 parts of 2,6-di-tert.-butylquinone.

2,6-di-tert.-butylquinone and 4-acetoxy-3,5-di-tert.-butylbenzaldehyde

A solution of 11 g. (0.05 mol) of 2,6-di-tert.-butyl-p-cresol in 86 ml. of glacial acetic acid and 83 ml. of acetic anhydride was cooled to 10° and 22.5 g. of concentrated sulfuric acid was added slowly with cooling and stirring. Then the solution was cooled to 0°, and 15 g. of chromium trioxide added slowly in small portions keeping the temperature below 3° C. The mixture was stirred for three hours after the addition was complete, poured into ice water, and stirred in the cold for an hour. The yellow, tarry solid was removed by filtration, dissolved in benzene, and washed with water, 2% sodium carbonate and again with water. Removal of the benzene yielded 11 g. of a yellow oil from which, on distillation, was isolated 1.9 g. of crude 2,6-di-tert.-butylquinone (B. P. 65–67°; 1 mm.), and 2.6 g. of the 4-acetoxy-3,5-di-tert.-butylbenzaldehyde (B. P. 120–126°; 1 mm.).

The quinone, on recrystallization from dilute ethanol, gave large golden yellow crystals, melting at 68°, and having a pleasant spicy odor.

Anal. Calcd. for $C_{14}H_{20}O_2$: C, 76.3; H, 9.2. Found: C, 76.0; H, 9.3.

It gave positive tests for a quinone with Fehlings' solution and with dilute alkali, but did not liberate iodine from KI, perhaps due to steric hindrance of the tertiary-butyl groups.

The quinone is reduced readily with sodium hydrosulfite to the colorless 2,6-di-tert.-butylhydroquinone, M. P. 101.5–102.5°. It also reacts readily with 2,4-dinitrophenylhydrazine hydrochloride in alcohol to give a yellow derivative, 2,6-di-tert.-butyl-4-(2',4'-dinitrophenylazo)-phenol, M. P. 184–185°.

The aldehyde fraction crystallizes from petroleum ether in large, colorless prisms, M. P. 75.5–76.5°, and has a pleasant woody-type odor.

Anal. Calcd. for $C_{17}H_{24}O_3$: C, 73.9; H, 8.7. Found. C, 73.9; H, 8.7.

The 2,4-dinitrophenylhydrazone melts at 263–264°.

Anal. Calcd. for $C_{23}H_{28}N_4O_6$: N, 12.3. Found: N, 12.2.

In preparing the 2,6-di-tert.-alkylquinones as described above, a reaction temperature of the order of from about −20° to +50° C. and possibly higher can be used. In general, the higher temperatures favor the formation of higher proportions of quinone and decrease the yield of aldehyde.

The homologous 2,6-di-tert.-alkylquinones, such as 2,6-di-tert.-amylquinone, can be prepared in the manner of the above detailed procedures, substituting the appropriate 2,6-di-tert.-alkyl-p-cresol or ester such as 2,6-di-tert.-amyl-p-cresol for the butyl homologue in the procedures.

We claim:

1. A method for preparing a 2,6-di-tert.-alkylquinone which comprises oxidizing a 4-acetoxy-3,5-di-tert.-alkyltoluene the tertiary alkyl groups of which each contain from 4 to 5 carbon atoms, in a solution of glacial acetic acid and acetic anhydride in the presence of sulfuric acid and chromic anhydride.

2. A method for preparing a 2,6-di-tert.-alkylquinone which comprises dissolving a 2,6-di-tert.-alkyl-p-cresol in a mixture of glacial acetic acid and acetic anhydride adding sufficient sulfuric acid and chromic anhydride to the reaction mixture to oxidize the cresol to a mixture of a 2,6-di-tert.-alkylquinone and a 4-acetoxy-3,5-di-tert.-alkylbenzaldehyde said tertiary alkyl groups containing from 4 to 5 carbon atoms.

3. A method for preparing 2,6-di-tert.-butylquinone which comprises oxidizing 4-acetoxy-3,5-di-tert.-butyltoluene in a solution of glacial acetic acid and acetic anhydride in the presence of sulfuric acid and chromic anhydride.

4. A method for preparing 2,6-di-tert.-butylquinone which comprises dissolving 2,6-di-tert.-butyl-p-cresol in a mixture of glacial acetic acid and acetic anhydride, adding sufficient sulfuric acid and chromic anhydride to the reaction mixture to oxidize the cresol to a mixture of 2,6-di-tert.-butylquinone and 4-acetoxy-3,5-di-tert.-butylbenzaldehyde.

5. A method for preparing 2,6-di-tert.-butylquinone which comprises dissolving 4-acetoxy-3,5-di-tert.-butyltoluene in a solution of a mixture of glacial acetic acid and acetic anhydride, adding sufficient sulfuric acid and chromic anhydride to the reaction mixture to oxidize the 4-acetoxy-3,5-di-tert.-butyltoluene to a mixture of 2,6-di-tert.-butylquinone and 4-acetoxy-3,5-di-tert.-butylbenzaldehyde diacetate.

6. A 2,6-di-tert.-alkylquinone the tertiary alkyl groups of which each contain from 4 to 5 carbon atoms.

7. 2,6-di-tert.-butylquinone.

8. 2,6-di-tert.-amylquinone.

CHARLES F. H. ALLEN.
DONALD M. BURNESS.

No references cited.